F. O. JAQUES, Jr.
NUT LOCK.
APPLICATION FILED JULY 24, 1911.

1,010,264.

Patented Nov. 28, 1911.

WITNESSES:
Julia Ricci
Lillian W. Luther

INVENTOR:
Fernando Oscar Jaques, Jr.,
By Chas. H. Luther
ATTORNEY.

COLUMBIA PLANOGRAPH CO., WASHINGTON, D. C.

UNITED STATES PATENT OFFICE.

FERNANDO OSCAR JAQUES, JR., OF CRANSTON, RHODE ISLAND, ASSIGNOR TO THE UNITED STATES PATENTED INVENTIONS CO., OF PROVIDENCE, RHODE ISLAND, A CORPORATION OF MAINE.

NUT-LOCK.

1,010,264.   Specification of Letters Patent.   Patented Nov. 28, 1911.

Application filed July 24, 1911. Serial No. 640,249.

*To all whom it may concern:*

Be it known that I, FERNANDO OSCAR JAQUES, Jr., a citizen of the United States, residing at Cranston, in the county of Providence and State of Rhode Island, have invented a new and useful Improvement in Nut-Locks, of which the following is a specification.

This invention has reference to an improvement in nut locks, and more particularly to that class of nut locks in which is employed a screw-threaded bolt, a nut engaging the threads of the bolt, means formed integral with the bolt, and means formed integral with the nut for locking the nut against a retrograde movement.

The object of my invention is to improve the construction of a nut lock, whereby the nut is positively locked to the bolt in any position it may be made to assume on the bolt.

Another object of my invention is to simplify the construction of a nut lock, whereby only one nut is used and the means for locking is formed integral with the bolt and with the nut, thereby eliminating all auxiliary means for locking the nut.

My invention consists in the peculiar and novel construction of a nut lock comprising a screw-threaded member and a nut, means formed integral with the screw-threaded member and means formed integral with the nut for locking the nut against a retrograde movement and details of construction, as will be more fully set forth hereinafter and claimed.

Figure 1:
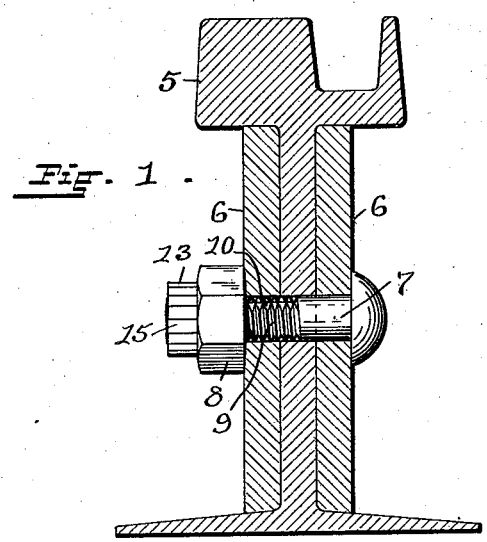
Figure 2:
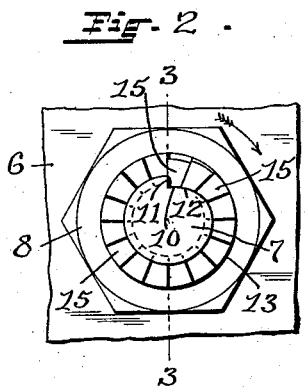
Figure 3:
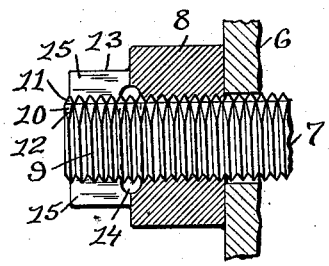
Figure 4:
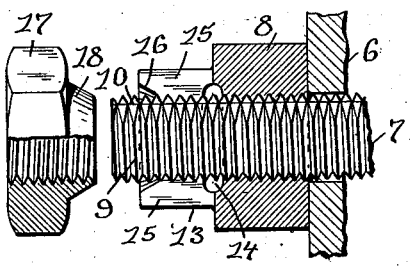

Figure 1. is a vertical transverse sectional view through a street rail and fish plate, showing a bolt and nut provided with my improved nut lock. Fig. 2. is an enlarged end view of the bolt and nut in the locked position and showing the greater part of the fish plate broken away. Fig. 3. is a longitudinal sectional view taken on line 3. 3. of Fig. 2. through the nut and fish plate, and Fig. 4. is a sectional view similar to Fig. 3. of a modified form, showing means for unlocking the nut.

In the drawings, 5. indicates a street rail, 6. 6. fish plates, 7. a bolt and 8. a nut. The street rail 5. and fish plates 6. 6. are shown only to illustrate a device to which my improved nut lock is particularly adapted.

The bolt 7. has the usual screw-threads 9. in which is cut a longitudinal groove 10. shaped to have a radial side 11. and an eccentric bottom 12. which merges into the outer circumference of the screw threads, in the direction in which the nut is turned up against the fish plate, as shown in Figs. 2. and 3.

The nut 8. has a concentric circular boss 13. on its outer end, an internal annular groove 14. at the junction of the nut and boss, and is internally screw-threaded through the nut and boss for the bolt 7. The boss 13. is formed integral with the nut and is sawed lengthwise from the end in to the nut, into a plurality of radially disposed parts. The boss is then compressed radially, closing the saw slits, correspondingly reducing the screw-threaded hole in the boss and forming a plurality of radially disposed spring arms 15. 15. as shown in Fig. 2. which extend outward from the end of the nut, as shown in Figs. 1 and 3.

When in use the nut is screwed on to the bolt, thereby expanding the spring arms 15. 15. into their original positions. As the nut is turned up on the bolt the spring arms 15. 15. snap in succession into the groove 10. and when the nut is screwed up to its limit, one of the spring arms 15. 15. snaps into the groove and engaging with the radial side 11. of the groove locks the nut against a retrograde movement of the nut.

This form of lock nut is particularly adapted for street railway use, where the nuts rust and are cut off to remove the same. For other purposes where it is required to unlock and remove the nut, the modified form shown in Fig. 4. may be used. In this form the boss 13. has a truncated cone shape recess 16. in the end and a nut 17. having a correspondingly truncated cone shape projection 18. is screwed on to the end of the bolt. The projection 18. engaging with a spring arm 15. moves the same out of engagement with the side 11. of the groove, thereby unlocking the nut. Both nuts may now be given a retrograde movement to remove the same from the bolt.

Having thus described my invention, I claim as new and desire to secure by Letters Patent:

1. A nut lock, comprising an externally screw-threaded member having a longitudinal groove, said groove having a radial side and an eccentric bottom which merges into the outer circumference of the threads, an internally screw-threaded member having a circular concentric boss, formed into a plurality of longitudinal radially disposed spring arms, whereby when the nut is screwed up into the position required, one of the spring arms will snap into the groove and engage with the radial side of the groove and lock the nut against retrograde movement.

2. A nut lock, comprising an externally screw-threaded member having a longitudinal groove extending through the screw-threads, said groove having a radial side and a bottom merging into the outer circumference of the threads, an internally screw-threaded member having a circular concentric boss formed into a plurality of longitudinal radially disposed spring arms, said spring arms being in contact with each other in their normal contracted positions.

3. A nut lock, comprising a screw-threaded bolt having a longitudinal groove extending through the screw-threads, said groove having a radial side and a bottom merging into the threads, a nut adapted to screw on to the bolt and having a circular concentric internally screw-threaded boss formed into a plurality of longitudinal radially disposed spring arms, said spring arms being in contact with each other in their normal contracted positions and forming a screw-threaded hole in the boss, the diameter of which is less than the screw-threaded hole in the nut.

4. A nut lock, comprising a screw-threaded bolt having a longitudinal groove extending through the threads, said groove having a radial side and a bottom merging into the threads, a nut having a circular concentric boss, an internal annular groove and an internally screw-threaded hole in the nut and boss, all formed integral, said boss being formed into a plurality of longitudinal radially disposed spring arms which are in contact with each other and the internal screw-threaded portions of which form a screw-threaded hole, the diameter of which is less than the diameter of the screw-threaded hole in the nut, when the arms are in their normal contracted positions.

5. A nut lock, comprising in combination, a screw-threaded bolt, having a longitudinal groove extending through the threads, said groove having a radial side and a bottom merging into the threads, a nut having a circular concentric boss, in the end of which is a truncated cone shape recess, an internal annular groove at the junction of the nut and boss, and an internally screw-threaded hole in the nut and boss, said boss being formed into a plurality of spring arms each arm having a section of internal screw-threads forming a screw-threaded hole the diameter of which is less than the diameter of the screw-threaded hole in the nut portion, all formed integral.

In testimony whereof, I have signed my name to this specification in the presence of two subscribing witnesses.

FERNANDO OSCAR JAQUES, Jr.

Witnesses:
JOHN H. McNULTY,
CHAS. H. LUTHER.

---

Copies of this patent may be obtained for five cents each, by addressing the "Commissioner of Patents, Washington, D. C."